Aug. 16, 1960 C. C. RAYBURN ET AL 2,949,148

RESISTOR TAPE APPLICATOR

Filed Dec. 29, 1955 9 Sheets-Sheet 1

INVENTORS
Charles C. Rayburn
James G. Black Jr.
BY George R. Perez

Donald P. Smith
Attorney

INVENTORS
Charles C. Rayburn
James G. Black Jr.
George R. Perez
BY Donald P. Smith
Attorneys

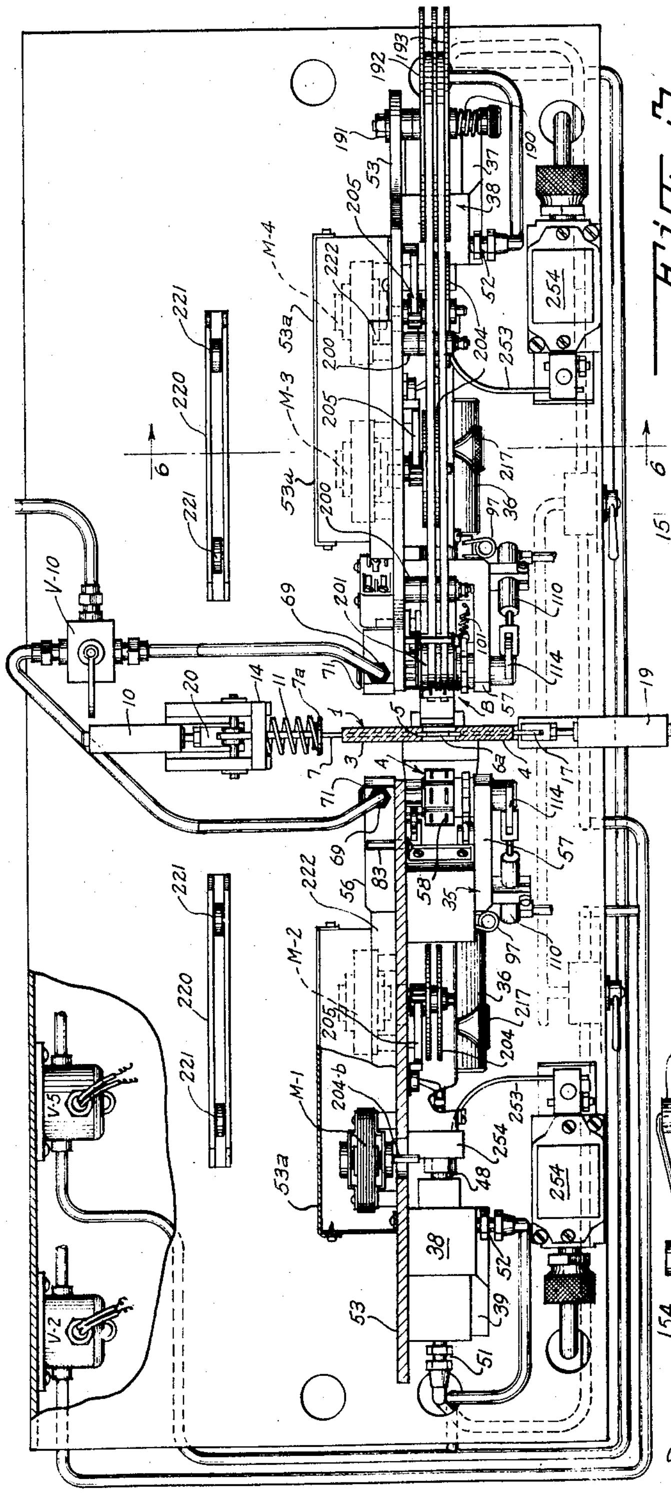
Fig. 3
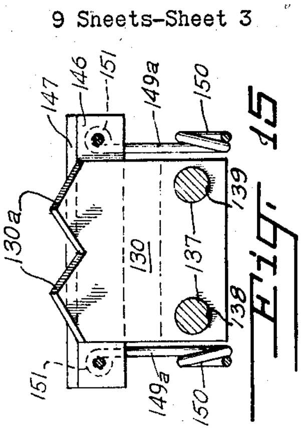
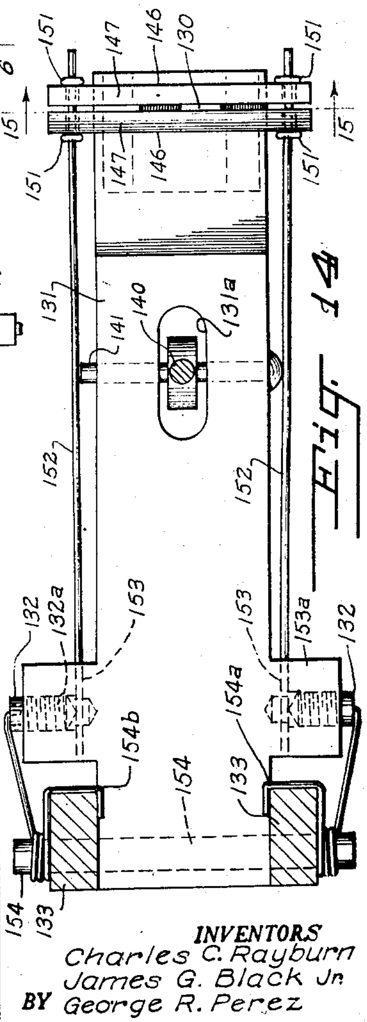
INVENTORS
Charles C. Rayburn
James G. Black Jr.
BY George R. Perez
Donald P. Smith
Attorney INVENTORS
Charles C. Rayburn
James G. Black Jr.
George R. Perez
BY Donald P. Smith
Attorney INVENTORS
Charles C. Rayburn
James G. Black Jr.
BY George R. Perez
Donald P. Smith
Attorney INVENTORS
Charles C. Rayburn
James G. Black Jr.
BY George R. Perez Donald P. Smith
Attorney

RESISTOR TAPE APPLICATOR

Filed Dec. 29, 1955 9 Sheets-Sheet 7

INVENTORS
Charles C. Rayburn
James G. Black Jr.
George R. Perez
By Donald P. Smith
Attorney Aug. 16, 1960 C. C. RAYBURN ET AL 2,949,148

RESISTOR TAPE APPLICATOR

Filed Dec. 29, 1955 9 Sheets-Sheet 8

INVENTORS
Charles C. Rayburn
James G. Black Jr.
BY George R. Perez

Donald P. Smith
Attorney

INVENTORS
Charles C. Rayburn
James G. Black Jr.
BY George R. Perez
Donald P. Smith
Attorney United States Patent Office 2,949,148

Patented Aug. 16, 1960

2,949,148

RESISTOR TAPE APPLICATOR

Charles C. Rayburn and James G. Black, Jr., Falls Church, and George R. Perez, Alexandria, Va., assignors, by mesne assignments, to Illinois Tool Works, Chicago, Ill., a corporation of Illinois Filed Dec. 29, 1955, Ser. No. 556,356

13 Claims. (Cl. 154—1)

This invention relates to improvements in tape applicators and more particularly to that type of device used in applying resistor tape to ceramics.

In the electrical art module assemblies are provided including components which may be in the form of wafers or discs, these wafers or discs being of ceramic material and having circuitry formed thereon by printing or otherwise and including resistor elements in which the resistor is in the form of a section of tape. The tape is normally manufactured in long strips wrapped in spool form and one of the objects of the present invention is to unwrap the tape from its spool, remove its protective coating, and apply it in predetermined pattern to one or both sides of a ceramic wafer.

It is an object, therefore, of the invention to provide an automatic mechanism which will feed and apply the tape and before the application of the tape to the ceramic wafer, sever the tape in predetermined lengths without interfering with the automatic operation of the assembly.

Another object of the invention resides in the provision of an applicator head capable of holding one end of a resistor tape delivered from a spool, positioning the end portion of the resistor tape with respect to a wafer, and after it is so positioned applying the tape to the wafer, severing the applied portion of the tape, releasing the severed part from the head, and repeating the operation.

Another object of the invention resides in the provision of an indexing mechanism which will position and arrange the related parts to permit such parts to automatically function in timed sequence to secure the desired results.

A still further object of the invention is the provision of a pressing mechanism for pressing the applied tape firmly into position after it has been so positioned by the applicator head, this pressing mechanism being independent of, but immediately subsequent to, the operation of the applicator to insure a firm bond between the tape and the ceramic wafer.

Other objects reside in automatic control mechanism for the relatively movable parts including the automatic control of the vacuum which is used at the applicator head for releasing the tape and associated operation of the tape severing mechanism.

Generally the invention comprehends the automatic feeding of the wafers, the automatic positioning of the wafers by the feeding mechanism in position for operation of the applicator head, the further sequential movement of the wafer to the pressing mechanism, and the feeding of the tape to the applicator head from a suitable source of supply while maintaining the tape under suitable tension or stretch for its association with the ceramic.

The present development further comprehends the use of a novel tape severing mechanism which is associated with the applicator head and timed with the feeding of the tape for severing the tape into predetermined lengths which comprehend tape resistance elements suitable for use in connection with the ceramic wafers.

These and further objects of the invention will more clearly hereinafter appear by reference to the accompanying drawings forming a part of the instant specification, and wherein like characters of reference designate corresponding parts throughout the several views, in which:

Fig. 3 is a section on line 3—3 of Fig. 2;

Fig. 14 is a top view of the knife of Figure 13;

Fig. 15 is a section on line 15—15 of Fig. 14;

Figure 1:
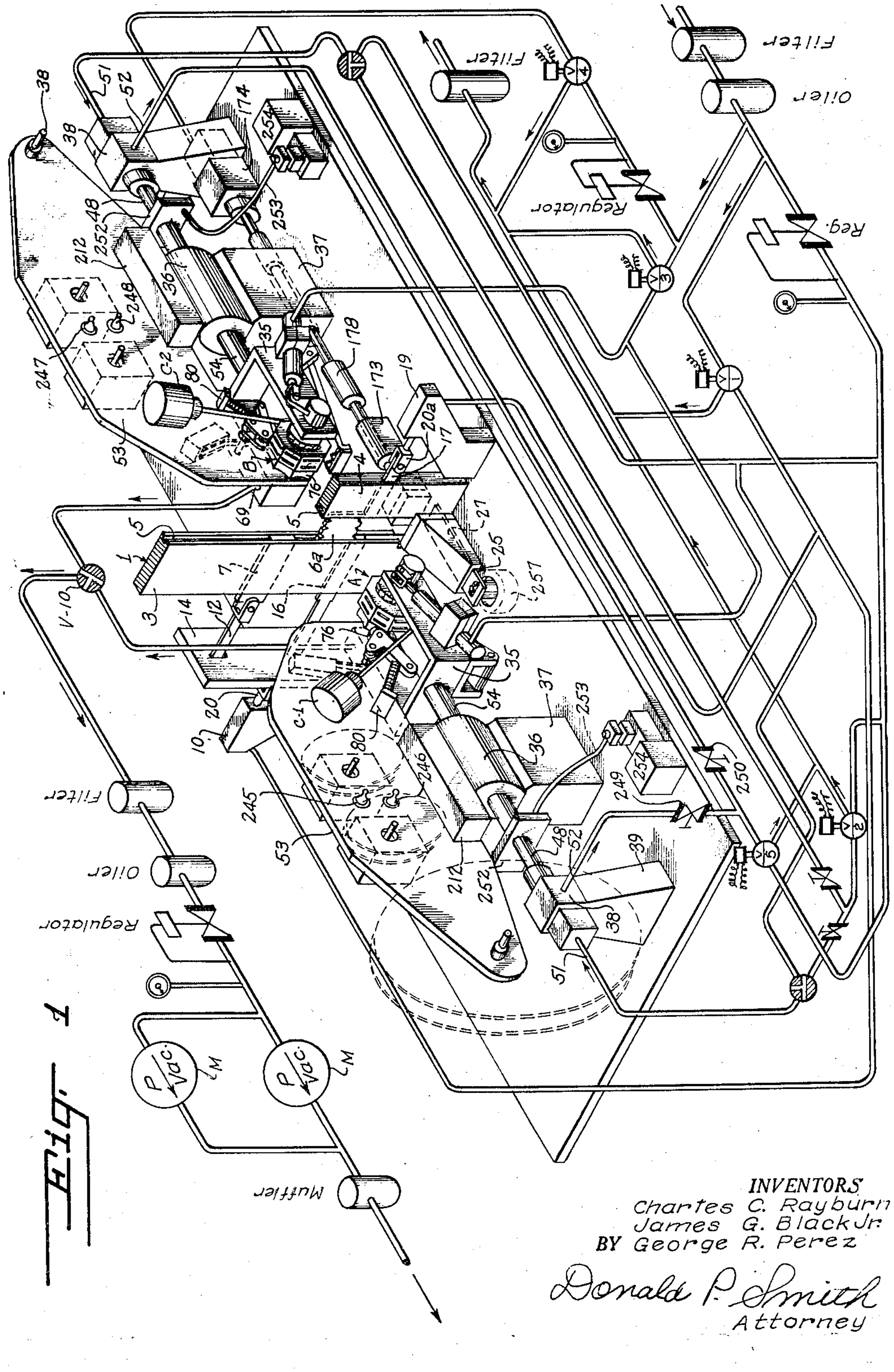
Fig. 1 is a schematic view showing in perspective the association and arrangement of parts and the associated fluid circuitry of the tape applicator machine, in accordance with the invention.

Broadly the present mechanism provides means in the form of a chute 1 for receiving wafers from an orienting machine discharge 1$^a$, the supply of wafers being controlled by a selenium cell assembly 2 and passing by gravity to an operative position by control mechanism. The chute above and below the selenium cell control 2 includes vertical guideways 3 and 4, each formed with relatively narrow aligned slots or grooves 5 for receiving the ceramic wafers 6 which travel in the grooves 5 edgewise to a stop 7 which reciprocates in the path of the descending wafers immediately above an operating station between two applicator heads A and B, to be hereinafter described.

Figures 2, 16, 17:
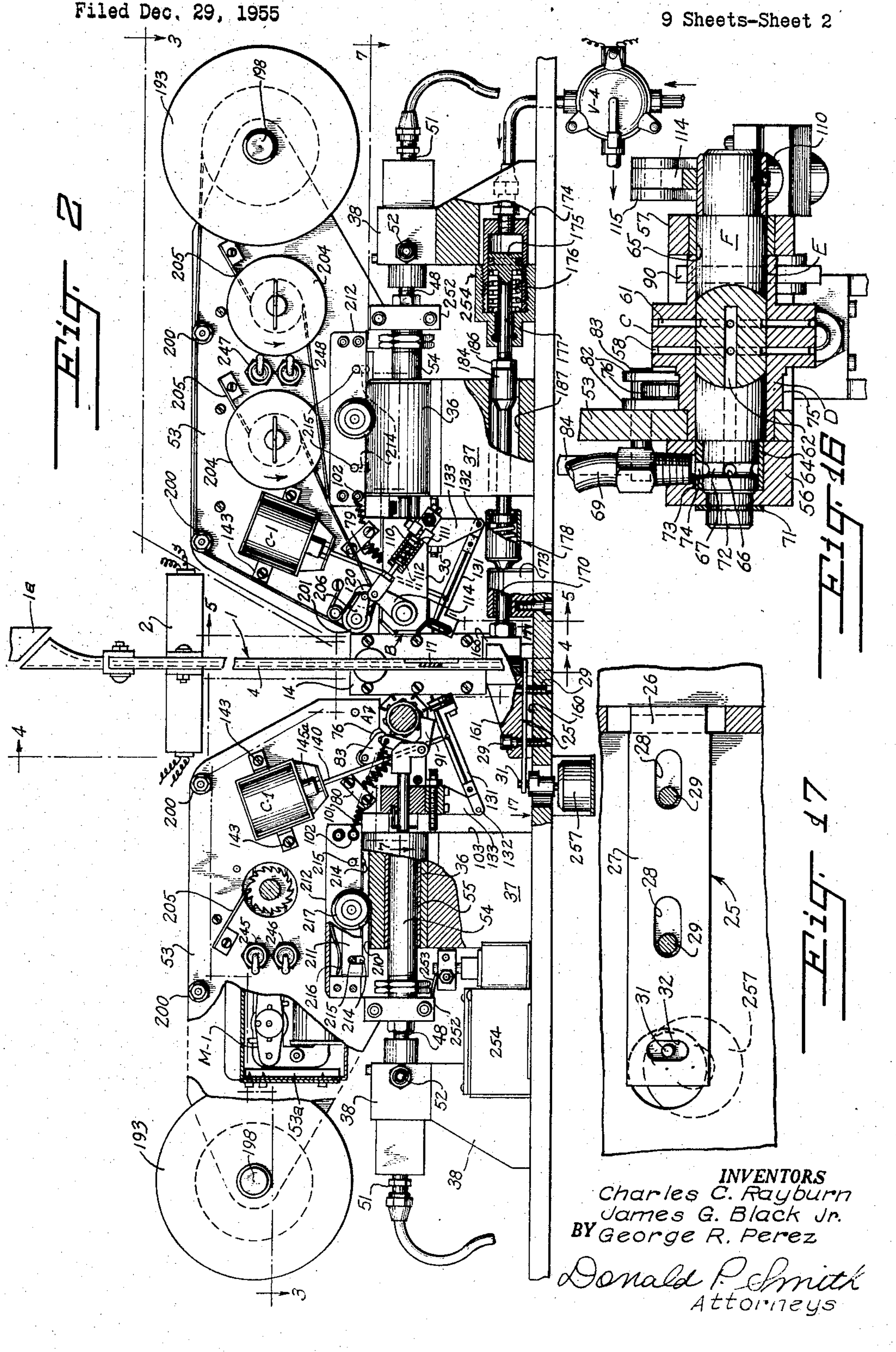
Fig. 2 is a side elevation of the machine of Figure 1 with parts shown in section.
Fig. 16 is an elevation, partly in section, showing the applicator head and valve mechanism taken on line 16—16 of Fig. 7.
Fig. 17 is an enlarged top plan view of the wafer releasing mechanism taken on line 17—17 of Fig. 2.
Figure 4:
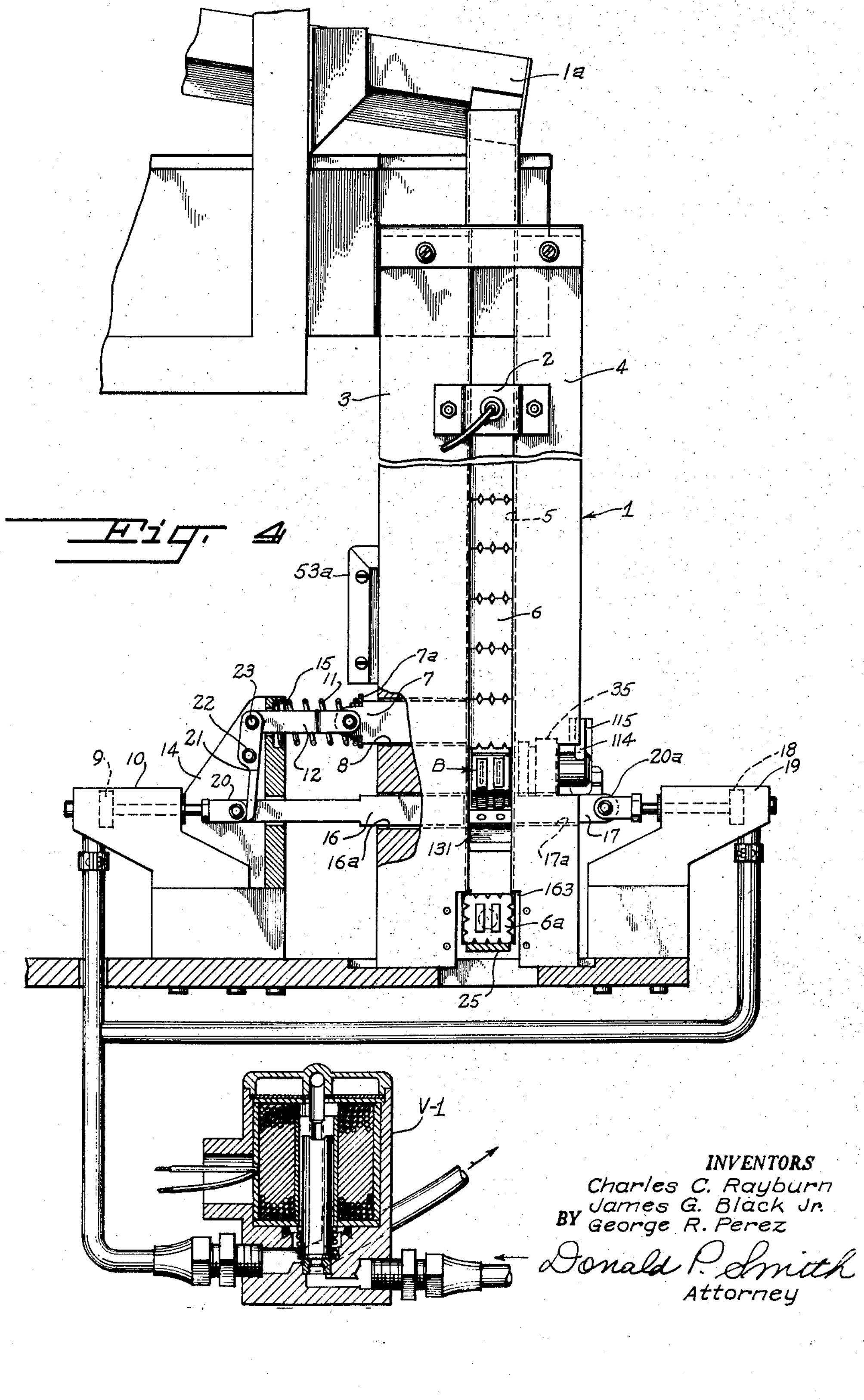
Fig. 4 is a section on line 4—4 of Fig. 2.

The sliding stop 7 travels through a horizontal passageway 8 (Figure 4) in the guideway 3 by means of piston 9 operating in air cylinder 10. The sliding stop 7 is normally held in closed position by a spring 11 mounted on the push arm 12, the latter being interposed between a washer 7$^a$ at one end of the stop 7 and a frame structure 14 which is provided with a socket 15 for receiving the outer end of the spring. The sliding stop 7 functions by clamping the lower wafer of the column of wafers in the guideway and against the groove in the opposite slideway 4. Thus the column of ceramic wafers in the slideway is retained against downward movement when the sliding stop 7 is in its spring actuated or operating condition. The ceramic wafer which is positioned between the applicator heads A and B and which has been released from the column of wafers 6 in the guideways is indicated at 6[a] and this wafer 6[a] is supported in this position for application of tape thereon by a pair of sliding opposed supports 16 and 17, each of which travels through horizontal oppositely arranged aligned slots 16[a] and 17[a] in the guide elements 3 and 4 formed beneath the general path of movement of the applicator heads A and B (Figures 1 and 4). These sliding supports 16 and 17 are each operated by pistons arranged in air cylinders at opposite sides of the machine. The sliding support 16 is operated from the piston 9 in air cylinder 10, while the sliding support 17 is operated from piston 18 in air cylinder 19. The sliding support 16 is connected to the operating piston 9 by the crosshead 20, while the sliding support 17 is connected to the piston 18 by the crosshead 20[a]. The sliding stops 16 and 17 travel to a position intercepting the movement of the wafers in their guideways 5 and which position is shown in Figs. 1 and 4. Obviously the column of wafers 6 when the sliding supports 16 and 17 are moved to close the channel 5 will support the column of wafers and it will be noted that the sliding supports 16 and 17 are so positioned beneath the stop 7 that there is only room for a single ceramic wafer 6[a] beneath the stack of wafers held by stop 7 as shown in Fig. 1. When the wafer 6[a] is supported on the sliding supports 16 and 17 it is directly intermediate the tape applicator heads A and B and in a position to be operated upon by these heads as will be more clearly hereinafter described. The sliding stop 7 which is normally operated by the spring 11 to stop the descent of the column of wafers 6 is connected with and actuated by the movement of the crosshead 20 of slide assembly 16, this interconnecting structure providing what may be termed an escapement mechanism for the feeding of a single wafer to a position between the tape applicator heads A and B. The simultaneous alternate movement of the stop 7 and the reciprocating support 16 is accomplished by the use of a link 21 which is pivoted at 22 to the frame 14, this link 21 being pivotally connected at its upper end by pin 23 to the push arm 12 and having its lower free extremity engaged by the crosshead 20. Thus when the wafer supporting member 16 moves in the path of the column of wafers 6, the sliding stop 7 is retracted which permits the column of wafers to move the distance of one wafer, as heretofore described, and to a position where the bottom of the lower wafer rests on the supporting members 16 and 17. In other words, as the supports 16 and 17 move into the path of travel of the column of wafers 6, this column of wafers is released by retraction of the sliding stop 7 and the lowermost wafer is in position intermediate the applicator heads A and B to permit these heads to function to apply the resistor tape thereto. After the operation of the applicator heads A and B, a similar operation takes place, i.e. the sliding supports 16 and 17 are retracted and the column retained during this operation by the sliding stop 7. When the parts have moved to this latter position, the lower wafer 6[a] which has had tape applied by the applicator heads A and B is free to descend to a lower stop 25 which has operating mechanism synchronized so that it is positioned at the proper moment to intercept the descending wafer 6[a]. With the wafer 6[a] moved to its bottom position on the stop 25, the supports 16 and 17 again are moved to intercept the column and the sliding stop 7 is retracted. The lower stop 25 is shown in Fig. 17 and includes a plate-like body 27 terminating in a supporting extremity 26. Guide slots 28 formed in the plate are pierced by guide pins 29 to provide a rectilinear movement under urge of the reciprocating solenoid 257 to which it is eccentrically connected by cross slot 31 and eccentric pin 32.

Figure 7:
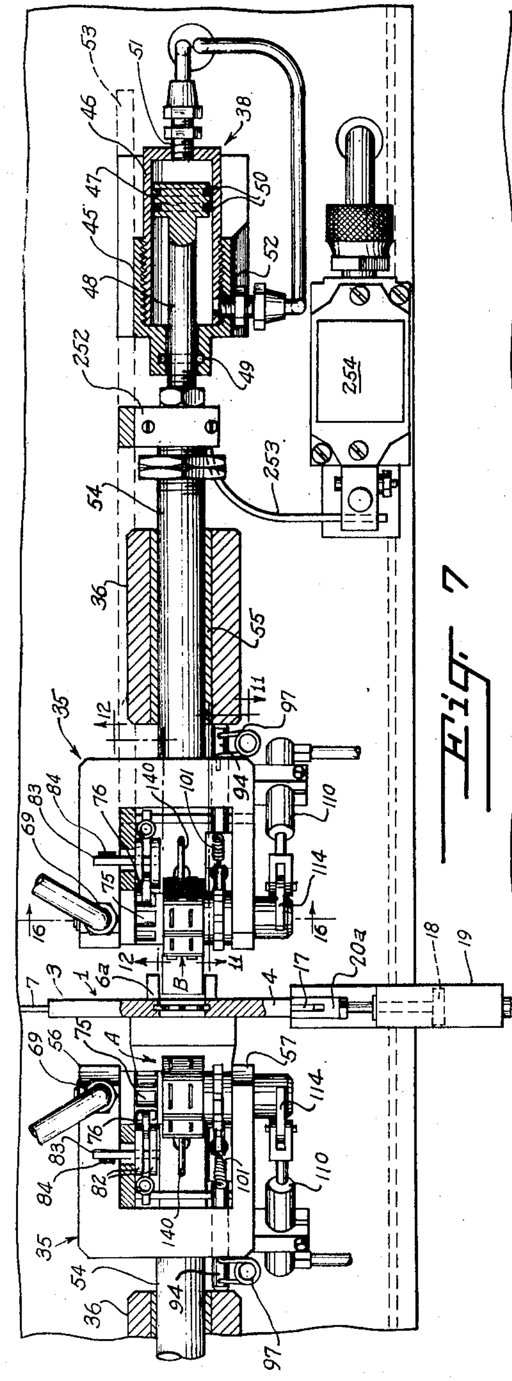
Fig. 7 is a section on line 7—7 of Fig. 2 with the head assembly retracted.

The tape applicator heads A and B are illustrated generally in Fig. 1, each of these heads being generally identical permitting a description of a single head in detail. Each of the applicator heads includes a supporting yoke 35, a guideway and bearing 36, mounted on a support 37, and a reciprocating fluid motor 38 mounted on support 39, the motor operating the yoke 35 by actuation of the slide shaft 54 in the direction of its axis. Each of these applicator heads is shiftable ninety degrees so that the tape may be applied to the wafer within a range of this movement and by means of the same mechanism. The motor 38 is best shown in Fig. 7 and includes a cylinder formed of cylinder sections 45 and 46, a sliding piston 47 movable therein and a piston rod 48, the piston rod and piston being provided with suitable packing as indicated at 49 and 50, respectively. The piston may be actuated from any suitable fluid and the ports for delivering and exhausting the fluid are indicated at 51 and 52. The actuation of the valves controlling the actuation of the fluid motor and the control of these valves will be hereinafter described.

The piston rod 48 operates the slide rod 54 reciprocating in the bearing 55 in the guideway 36, this slide rod being connected to the yoke 35 carrying an applicator head A or B. The yoke 35 includes the spaced parallel arms 56 and 57, the latter being relatively of greater dimension to facilitate fluid passage as will hereinafter appear. The applicator head is best shown in detail in Figs. 9, 10 and 16 and is mounted between the yoke arms 56 and 57 of the yoke 35. The applicator head includes a prismatic body with a medial octagonal tape applicator portion C, an end portion D formed with a plurality of annular positioning recesses 75, and an opposite end portion E formed with ratchet teeth for the feeding mechanism at the other end. The applicator head is mounted for rotation on a hub structure generally indicated by reference character F, this hub structure having its end portions supported for oscillation in the yoke extremities 56 and 57 by power means connected to an extremity of the hub projecting outwardly from its mounting in yoke extremity 57, as will be hereinafter more fully described. The tape applicator portions C of the heads are of octagonal prismatic form thereby presenting eight separate flat faces. Each face of portion C has a pair of concave slots 58 extending inwardly toward the center of portion C. The contiguous end portions 59 of adjacent faces are separated by transverse slots or recesses 60 (Figures 13 and 16), in which latter a knife travels for severing the tape as will hereinafter appear. Each of the concave faces 58 which forms separate applicator areas have communicating ports 61 which connect with an axial passageway 62 formed in a hub structure F mounted at 64 and 65 in the yoke arms 56 and 57, respectively. The axial passage 62 formed in the hub structure F communicates with a suitable source of vacuum through radial port 66 at one end of the hub structure and within the yoke arm 56. The radial passage 66 communicates with the annular groove 67 in the end of the hub structure and this annular groove 67 communicates with a suitable pipe connection 69 threaded into the extremity of yoke arm 56. This end of the hub F is fixed against axial displacement by the snap ring 71 (Figure 16) fitting in groove 72 in the hub and abutting the outer face of the yoke arm 56. A tubular bearing 73 provided with a port 74 encases a portion of the hub F within the yoke arm 56 and not only forms a bearing for the parts but also provides a seal to confine the pressure area.

Figures 9, 10, 11, 12, 13:
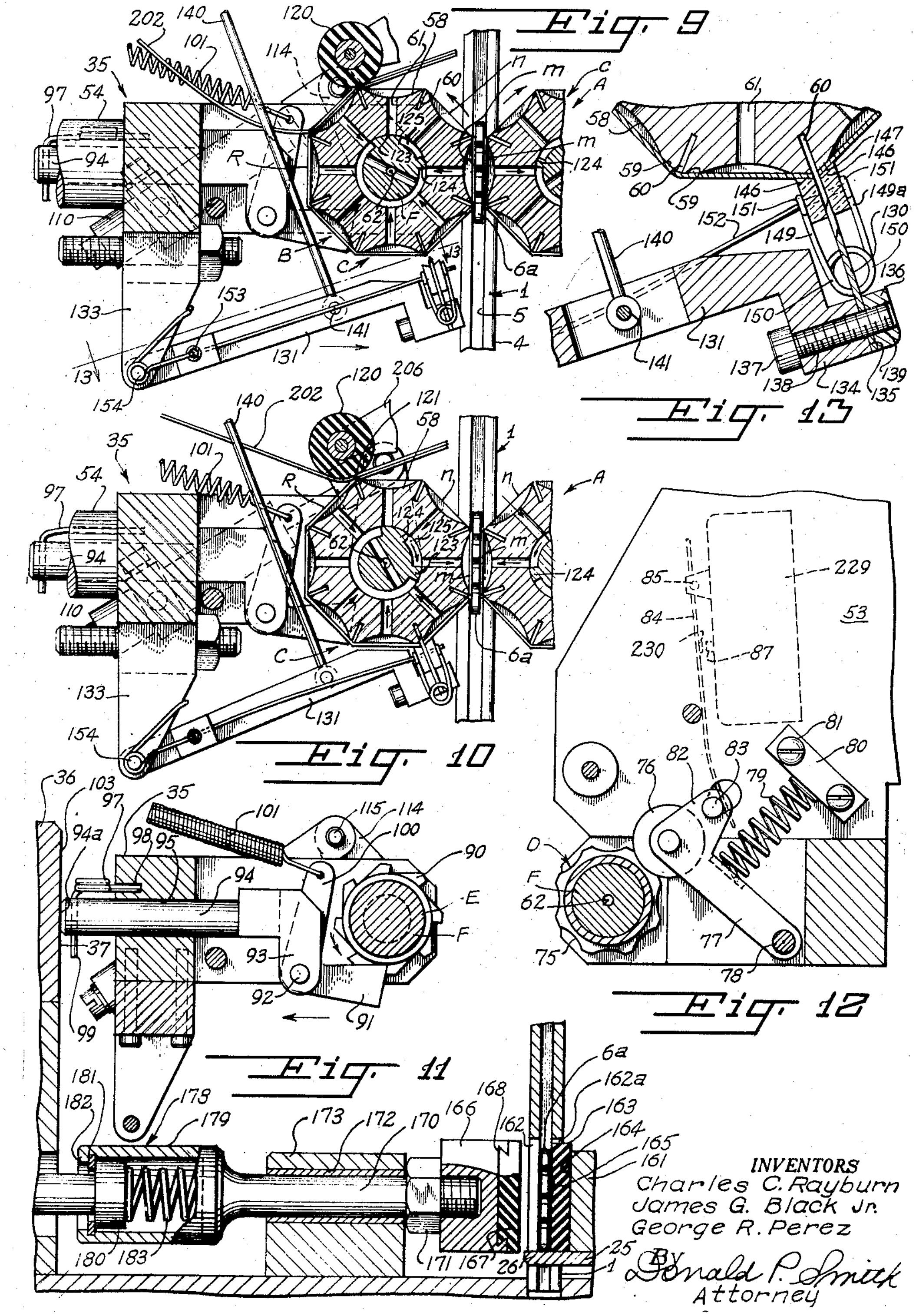
Fig. 9 is an enlarged fragmentary section on line 9—9 of Fig. 8.
Fig. 10 is an enlarged section on line 9—9 of Fig. 8 showing the valve mechanism in its released position.
Fig. 11 is an enlarged section on line 11—11 of Fig. 7 showing the lower presser mechanism.
Fig. 12 is an enlarged section on line 12—12 of Fig. 7 showing the positioning means.
Fig. 13 is an enlarged sectional view showing the knife and the holding head for the knife of Figures 9 and 10.

Inwardly of the yoke arm 56, the end portion D of the applicator head is formed about its periphery with a plurality of arcuate recesses 75, best shown in Fig. 12, and these recesses are provided to engage a positioning mechanism including roller 76 carried by a lever 77 pivoted at 78 to the frame. The lever 77 and roller 76 are spring urged by spring 79 which is interposed between the back face of the lever 77 and a stop plate 80 secured to the frame by screws 81. The lever 77 is provided adjacent its free end with a pair of spaced ears 82 which project upwardly from the lever and are connected by a pin 83. A spring switch arm 84 pivoted at 85 is provided with a contact 230 engaging a contact 87 and the free end of this spring switch arm bears against the pin or roller 83 so that the oscillating movement of the roller in seating in the recesses 75 will cause an opening and closing of the switch 229 for regulating the motor as shown in the diagrammatic disclosure of Fig. 18 and will more fully hereinafter be described. Obviously the seating of the roller 76 in the arcuate recesses 75 in turn will function to sequentially position the various applicator faces 58 for association with the ceramic wafer $6^a$.

The applicator head portion E, at the opposite end of the octagonal applicator face from the positioning mechanism described and adjacent the arm 57 of the yoke, is formed with a plurality of ratchet teeth 90, see Fig. 11, which are spaced symmetrically about the hub and are eight in number corresponding to the number of applicator faces on the octagonal head. Engaging the ratchet teeth 90 and functioning to rotate the applicator head about its hub F is a pivoted pawl 91 mounted on pivot pin 92 located at the free end of the offset head 93 of the reciprocating rod 94. The reciprocating rod 94 slides in a guideway 95 in the base of yoke 35 and this rod 94 is normally urged outwardly by the spring 97, one end 98 of which is fixed in the yoke 35 and the other end 99 of which extends through an opening in the outer end portion of the rod 94. The pawl 91 is of bellcrank form with the inner arm 100 of the bellcrank connected to one end of coil spring 101. The other end of the coil spring 101 is fixed to a portion of the reciprocating assembly at 102, as shown in Fig. 2. The spring 101 is normally tensioned to hold the pawl 91 in engagement with one of the ratchet teeth 90 of the applicator head. It will be noted that the outwardly urged reciprocating rod 94 has its free extremity $94^a$ positioned to abut the adjacent face 103 of the fixed slide housing body 36, whereby as the yoke and its applicator head is reciprocated by the motor 38, the ratchet is operated to rotate the applicator head.

By this structure the reciprocation of one of the yokes 35 by its motor 38 in one direction moves one face of an applicator head against a ceramic wafer to apply a tape and upon retraction of the yoke and its applicator head the pawl 71 rotates the head one-eighth of a turn to present a new face and a new tape section and simultaneously the positioning roller 76, operating in the recesses 75, actuates the spring switch arm 84 to close the contacts 230 and 87.

The mounting hub assembly F (Figure 16) with its axially extending port 62 communicates with a source of vacuum through the pipe 69 and supplies vacuum to the applicator faces through the radial ports 61. By reference to Figs. 9 and 10 it will be seen that the hub F, due to its structure and its relationship to the applicator head mounted thereon, forms a valve for alternately applying and relieving vacuum to the faces as they are presented to the ceramic wafer upon which they are operating. Each hub F is oscillated by a fluid motor 110 (Figure 2), mounted on arm 57 of one yoke 35, respectively. In each motor 110 there is arranged a spring urged piston 111 and a spring 112 normally attempting to move the piston 111 inwardly to oscillate an arm 114 fixed to hub F (Figure 16) and to carry with it the hub F and its associated valve mechanism. Pressure applied to the piston 111 through connection 115 will move the valved hub F counterclockwise.

As seen from Fig. 9 the resistor tape is applied to six faces of the octagonal applicator head C and suction from the radial ports communicating with these faces and from axial ports 62, radial ports 66 and conduit 69 apply suction to all of these faces. Faces *m* in Fig. 9, while still under vacuum, are applying severed ends of the tapes R to the adjacent faces of the ceramic wafer $6^a$. When applied to the face and prior to the removal of the applicator head from the ceramic wafer, the valved hub F is oscillated on its axis to vent the face *m* to the atmosphere through the next adjacent unoccupied face. This is accomplished by the provision of the spaced, relatively long web 123 and the short web 124 formed in the annular groove at the periphery of the hub F and into which the radial ports 61 open. These webs are of such dimension and are so positioned that the operation of the piston in the pressure cylinder 110 will rotate the hub F a sufficient distance so that the arcuate port 125 between the web sections 123 and 124 will open communication between the face *m* of the applicator and face *n*, relieving vacuum on the tape applied to the wafer $6^a$ and permitting withdrawal of the applicator head without removal of the tape section. The web or valve structure 123 is of sufficient length that it will maintain at all times the vertical port communicating with the upper applicator face closed so that there will be no tendency to apply suction to the tape R as it approaches the head.

The cutter assemblies are illustrated in Figs. 14 and 15, while the movement of the cutters and their associated parts is illustrated in Figs. 9, 10 and 13. Each cutter blade 130 is of flat plate form and includes a pair of V-shaped cutting faces suitably beveled at $130^a$ to provide cutting edges for quickly and easily severing the cutting tape without distorting pressures or stresses. Each cutter blade 130 is mounted on an arm 131 pivoted at 154 on the frame extension 133, this arm having outwardly offset extremity 134 against the outer flat face 135 of which the cutting element 130 is clamped by clamp block 136 and screws 137, these screws extending through aligned openings in the offset extremity 134 of the arm and in the clamping block 136. These aligned openings indicated at 138 and 139, respectively, are adapted for the reception of the screws 137 which are shown with their heads abutting the offset portion 134 of the arm. Each arm oscillates on its pivot 154 by means of a link 140 which is pivotally connected at its outer end portion with the cutter arm 131 by means of the pivot pin 141. The pivot pin 141 extends transversely through the respective cutter arm 131 and medially of its length there is an opening formed in the arm at $131^a$ to provide an area for the connection of the parts. The opposite ends of the links 140 are connected respectively to one of the solenoids C–1 (Figure 2), which is supported by clamps 143 to the frame plate 53. A suitable source of current with proper controls, hereinafter described, is connected with the solenoids to operate cores $145^a$ to which the outer ends of the links 140 are respectively directly connected to swing the cutter assemblies on their pivots 154.

Each of the oscillating cutters is provided with a pair of hold-down heads or pads 146 (Figure 13) spaced at opposite sides of the cutter 130 with their inner faces abutting the adjacent faces of the cutter, these pads 146 extend laterally beyond each end of the cutter 130, as best shown in Fig. 14, to provide portions for connection with the spring suspension provided therefor. Each of the pads 136 is provided at its outer work-engaging faces with angular portions 147, the angle of these faces corresponding to the angle of the portion of applicator head with which it is to be engaged at each side of the slot 60 of the head and these faces function to prevent displacement of the tape during the cutting operation. The hold-down heads or pads 146 are supported between a pair of spring clamps formed with a pair of spaced arms 149 and $149^a$, these spring arms being connected intermediately by a coil or loop 150 which normally urges the spring arms 149 and $149^a$ together to clasp the pads 146 against the adjacent faces of the cutter 130, The extremities of the arms 149 and 149$^a$ terminate in loops 150 which are aligned at each side of the hold-down pads 146 and through which the spring supporting arms 152 extend. These supporting arms 152 are in the form of elongated spring rods which are rigidly secured at their inner end portions in the longitudinally extending slots 153 formed in the wing projections 153$^a$ at each side of the oscillating arm, as best shown in Fig. 14. Screws 132 extend into these wing projections 153$^a$ and clamp the spring arms 152 in position. The screws 132 are provided with central sockets 132$^a$ which receive inwardly projecting terminals of the spring arms 154$^a$, these spring arms 154$^a$ being coiled about the pivot pins 154 and having their terminals 154$^b$ clamped about the frame structure 133. These spring arms 154$^a$ provide means to insure the quick return of the cutter arm and the cutter carried thereby, after the cutting operation, it being remembered that this cutting operation and, in fact, the entire operation is carried out with great rapidity and any lagging of any one part might defeat the purpose of the development. Thus the spring supporting arms 152 provide spring pressure to the pads 146 and the springs 154$^a$ remove the cutter 130 and the pads 146 after the cutting operation.

It will be noted, by reference to Figures 10 and 13 that initially the hold-down pads 146 are in engagement with the tape at each side of a slot 60 and as the cutter arm 131 oscillates from the operation of the solenoid, the cutter 130 moves through the hold-down pad and through the tape and into the slot 60, extending transversely of the applicator head and medially of the hold-down pads 146. Due to the spring arms supporting the pads 146 the tape is held in position prior to and after the cutting operation. This operation takes place one step ahead of the application of the tape to the ceramic wafer and the tape is moved immediately after this severing operation into position for application to the wafer. It will also be noted (Figure 10) that suction is being applied to the severed section of the tape to retain the same in position as it moves to vertical position for application to the ceramic wafer and that the vacuum is not released from the tape until it has been applied to its proper position on the ceramic wafer. Immediately after the application of the tape to the ceramic wafer, the vacuum is relieved as shown in Fig. 10, and the wafer with the applied tape falls from the position in Fig. 10 to a presser position shown in Fig. 11.

In the presser position the ceramic wafer having moved from its position between the applicator heads drops by gravity to the supporting area 26 of the stop plate 25 which through properly synchronized means, to be hereinafter described, has been shifted by the motor 30 to intercept the movement of the wafer. It will be noted that the stop plate 25 operates in a slot 160 formed in the supporting base structure 161 associated with the wafer chute or guide means 1 and that the chute 1 terminates immediately above the supporting area 26 of the stop 25. By reference to Fig. 11 it will be seen that the base of the chute 1 immediately above the supporting area 26 of the stop plate 25 is formed with lateral windows 162 whereby the wafer when supported on the stop 25 has its entire side faces fully exposed for association with the presser mechanism. The presser mechanism includes a fixed pad 163 positioned in one window at one side of the wafer, this pad being of suitable material for applying and distributing forces to the entire surface area of the wafer. The pad 163 is fixed to the flat face 164 of the supporting base structure 161 and the working face of the pad indicated at 165 is immediately adjacent and generally flush with the ceramic wafer 6$^a$ which rests upon the stop 25. Moving through the opposite window 162 is the presser applicator head 166 having a suitable dimension to move through the window 162 and apply pressure to the exposed area of the wafer through a pad 167 which is connected to the head 166 by the dovetailed extension 168 which fits in a correspondingly shaped slot in the head 166. The head 166 is threaded on the end of the shaft 170 and an adjusting nut 171 is provided for adjusting the head 166 so that the stroke of the head may be varied in accordance with requirements. The shaft 170 is mounted in the cylindrical bearing 172 in the bearing block 173 and is reciprocated by a fluid motor 174 shown in Fig. 2. The fluid motor 174 includes a spring returned piston 175 associated with the coil spring 176 in the motor cylinder. The piston rod 177 is connected through the flexible coupling 178 to the sliding rod 170 of the presser head 166. The spring coupling includes a cylinder 179 fixed to the outer end of the sliding rod 170, the cylinder 179 receiving the enlarged cylindrical head 180 of the piston rod 177. The head 180 is locked in the open-ended cylinder 179 by the snap ring 181 which abuts against the in-turned annular flange 182 at the outer end of the piston 179. The coil spring 183 is interposed between the end of the cylindrical head 180 and the inner end of the cylinder 179 and normally urges the head outwardly against the snap ring 181. By this means fluid pressure applied to the piston 176 is transmitted to the presser head 166 through the medium of the spring 183, thus providing a soft gradual pressure to the tape on the faces of the ceramic wafer 6$^a$ which during the pressing operation is obviously receiving pressure on each of its opposite flat faces by the fixed pad 163 and the reciprocating pad 167 on the mechanism described. In Fig. 2 it will be seen that an adjustable cylindrical guide 184 is mounted on the piston rod 177 and is locked and adjusted by the lock nut 186. This cylindrical guide 184 moves in the bore 187 formed in the adjacent support 37. The operation of the fluid motor 174 is from a source of fluid to be hereinafter described.

Figures 5, 6, 19:
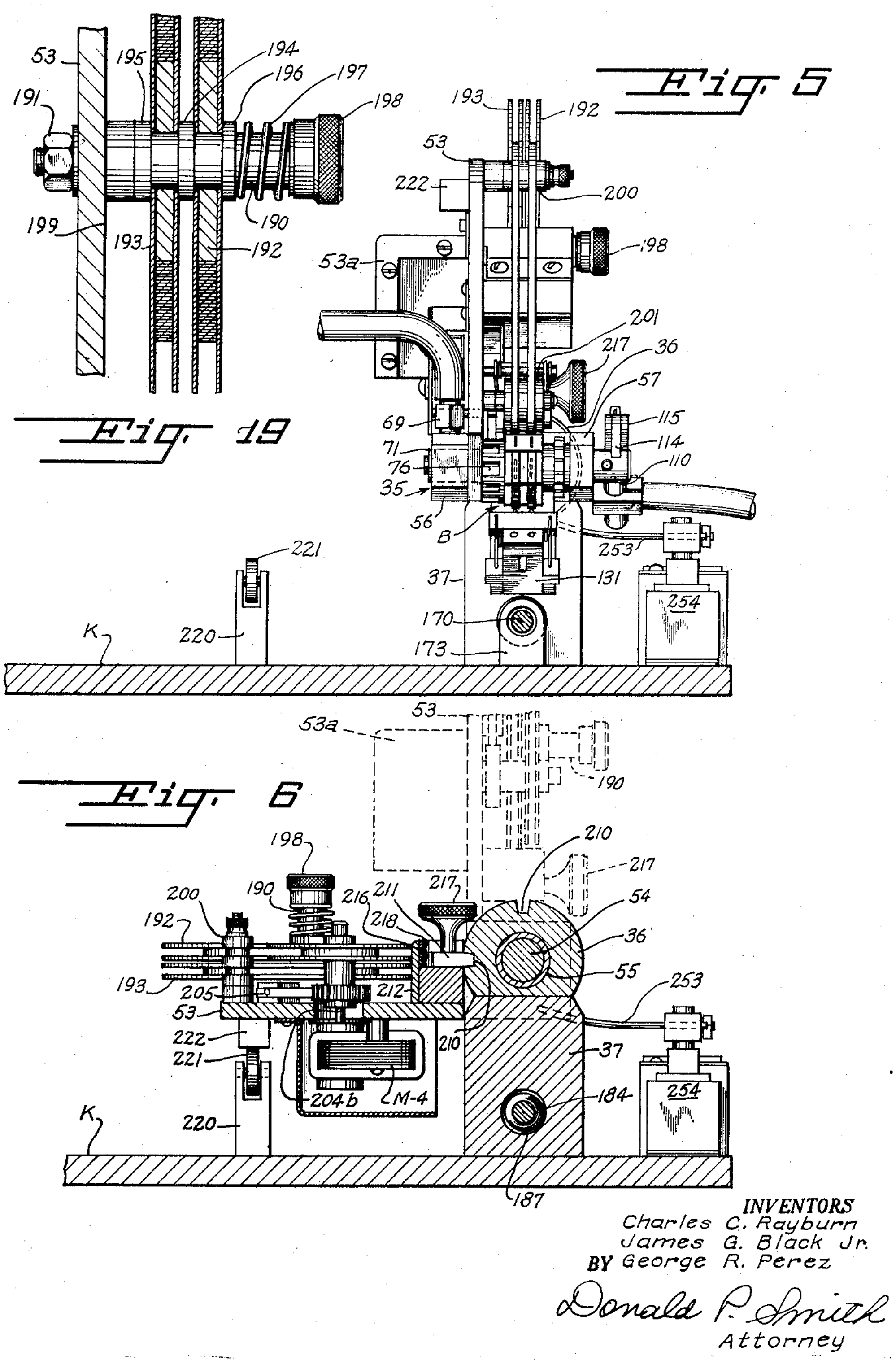
Fig. 5 is a section on line 5—5 of Fig. 2 showing the head in vertical position.
Fig. 6 is a section on line 6—6 of Fig. 3 showing the head assembly moved to horizontal position.
Fig. 19 is an enlarged fragmentary view, partly in section, showing the mounting for the resistor tape spools shown in Figure 2.

As set forth above, the basic object of the present development is to apply resistor tape to ceramic wafers. The resistor tape is furnished in lengths up to 100 feet, dry on one side and provided with an adhesive substance on the other. The side with the adhesive substance is protected by a polyethylene strip. The present machine is capable of applying one or more pieces of tape at the same time to opposite sides of a wafer, and normally the width of the tape can vary from .100 to .220 of an inch plus or minus. In the present machine provision is made for applying either one or two pieces of tape to each side of a ceramic wafer and to apply this tape in either a vertical or a horizontal position as determined by the position of the applicator heads. The length of the pieces of tape to be applied is determined by the diameter and number of faces on the applicator head. In the present disclosure each head is octagonal and obviously the size of the head can be modified so that the individual faces will accommodate any desired lengths of tape. The tape is initially furnished to each applicator head from a pair of spools on each side, which are mounted on a post or pin 190 threaded into the panel 53 and secured thereto by the nut and lock washer 191. Each pair of spools are indicated by reference characters 192 and 193 and are separated by a Teflon washer 194 (Figure 19). Similar washers are provided at the outer faces of the spools 192 and 193 as shown at 195 and 196, the latter forming a stop for the coil pressure spring 197 which is interposed between the same and the adjusting nut 198 of the pin 190, the spring normally applying pressure to the spool assemblies and against the spacer 199 which is interposed between the Teflon washers 195 and the panel 53. This provides a control mounting for the resistor tape spools 192 and 193 as the tension of the spring 197 can be modified to increase or decrease the friction of the Teflon washers against the lateral surfaces of the spools by adjusting the nut 198. From each pair of spools 192 and 193, the tape passes over the guide rollers 200 mounted at the upper edge of the panel 53 and about the spacer guides 201 and beneath the presser roll 120, shown in Figs. 9 and 10, the presser rolls being in engagement with the applicator heads and marking the separation point between the tape R and the polyethylene protective sheeting 202, this coating material being stripped from the tape and picked up by the power driven rolls 204 also mounted on the panel 53. The power driven rolls 204 are driven by rotary electric take up motors $M_1$, $M_2$, $M_3$ and $M_4$ positioned on the opposite sides of the panels 53 (see Fig. 3) and driving the shafts 204[b] on which the take up rolls 204 are mounted. The motors $M_1$, $M_2$, $M_3$ and $M_4$ for the take up rolls on both panels are separately controlled by switches 245, 246, 247 and 248 (Figure 1) mounted on the inner faces of the panels 53, these switches permitting one or both of the motors on each panel to operate in accordance with requirements. It will be noted by reference to Fig. 3 that the panels 53 have housings 53[a] which enclose the motors $M_1$, $M_2$, $M_3$ and $M_4$ for driving the take up rolls. The take up rolls 204 are spaced laterally of each other and are provided with brake elements 205 to prevent slack during operation.

It will be noted that the presser rolls 120 and the spacer guide 201 are linked together by link member 206 and a spring 207 applies pressure to this assembly for maintaining the presser roll 120 normally in contact with the tape and against the applicator heads. It will be understood that where wider tape is provided the spools 192 and 193 likewise will be of greater width and the mounting of these spools provides accommodations for such modification. Likewise the associated guide rolls and parts cooperating with the feeding of the tape between the spools and the applicator heads can be modified to accommodate different widths of tape.

The swinging panels 53, as has been noted heretofore, each support the entire operating mechanism for feeding the tape to the applicator head and for severing the tape. This arrangement is necessary to permit conversion of the machine from a position for applying the tape vertically to a position where the tape is applied horizontally and necessitates a movement of the panel and of the applicator head and associated parts ninety degrees about the axis of the reciprocating shaft 54 which actuates the applicator head for applying the tape to the ceramic wafer. By referring to Fig. 6 it will be seen that the slide bearing housing 36 is provided with a pair of elongated slots 210, spaced at ninety degrees, which cooperate with a locking member in the form of an elongated slide 211 carried in a housing 212 fixed to the inner face of the panel 53. The elongated sliding lock 211 is provided with spaced slots 214 which are associated with pins 215 extending from the side wall of the housing 212 and a spring 216 normally urges this sliding lock 211 outwardly for engagement in the slots 210 in the housing 36 and a handle member 217 extending through a slot 218 in the housing functions to permit manual operation of the sliding lock. By this arrangement a panel carrying with it the applicator head and the associated parts heretofore mentioned can be rotated ninety degrees so that the sliding lock 211 will be moved from the upper to the lower recess 210 and thus lock the panel in position and hold the applicator head so that the resistor tape will be applied horizontally to the ceramic wafer 6[a]. The pair of panels 53 for each assembly are individually adjustable and this would permit the application of resistor tape either horizontally or vertically, or horizontally and vertically, to both sides of a ceramic wafer. In Fig. 3 the three-way valve V10 provides the means for controlling the vacuum to either or both of the heads A and B so that both of the heads may be supplied with operating power for simultaneous operation, or one of the heads can operate alone. In the latter event, the non-working head will assume a position with its face abutting the back of the ceramic under fluid pressure to provide a cushion for the ceramic as the working-head applies the tape thereagainst.

Figure 20:
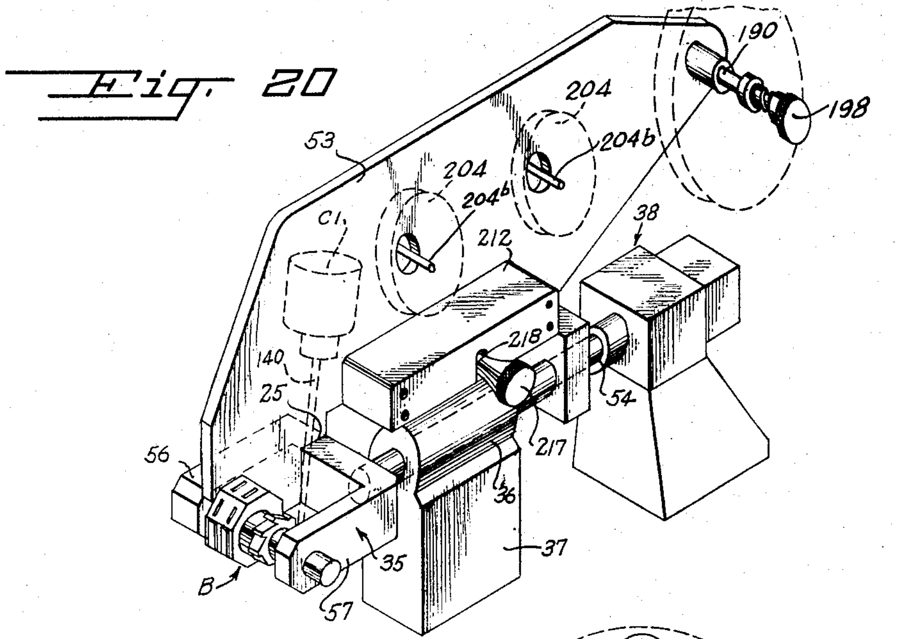
Fig. 20 is a perspective view of one of the applicator heads and its supporting panel shown in Figure 5, with the parts in vertical position.
Figure 21:
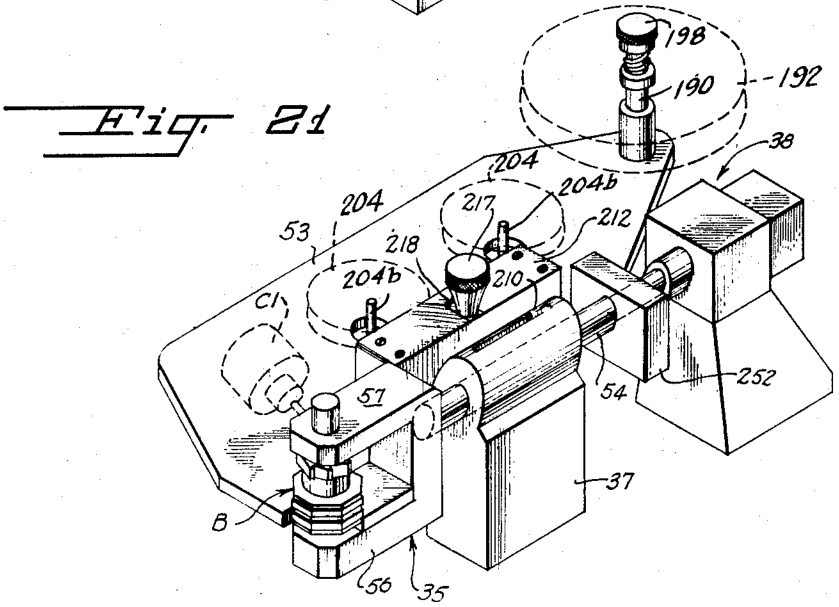
Fig. 21 is a similar view to Figure 20 with the parts in horizontal position.

In Figs. 3 and 5 the base of the machine K has mounted thereon a standard 220 with spaced rollers 221 mounted therein and projecting above the edge of the standard. These rollers 221 are longitudinally aligned and receive the runner 222 fixed to the outer face of the panel 53 adjacent its outer edge portion, whereby the panel 53 when swung to its horizontal position is provided with a trackway to permit its reciprocating movement with the applicator head under power supplied by the fluid motor 38. One of the panels 53 and the assembly carried by the panel is best illustrated in Figs. 20 and 21. In these figures it will be seen that the base of yoke 35 extends through a slot 225 in the bottom of the panel 53 and the yoke arm 56 is spaced on the opposite side of the panel from yoke arm 57. The yoke arm 56 lies flush with the adjacent surface of the panel 53 and is fixed thereto in any desired manner to provide rigidity between the yoke and the panel for the purpose of transmitting simultaneous movement between these parts, i.e. when the panel is swung ninety degrees the slide shaft 54 must rotate therewith and carry with it the applicator head and associated parts including the various operating mechanism essential to the actuation and manipulation of the applicator head. Likewise, the resistor tape spools and feed mechanism for the resistor tape is entirely mounted on the panel 53 so that all of these parts move simultaneously with the movement of the head and whereby all of these mechanisms can operate in either vertical or horizontal position. The panels and the associated parts are identical at each side of the machine, although they may be independently operated, as suggested heretofore, for the purpose of applying tape either vertically or horizontally, as required, at each side of the ceramic water.

Figure 18:
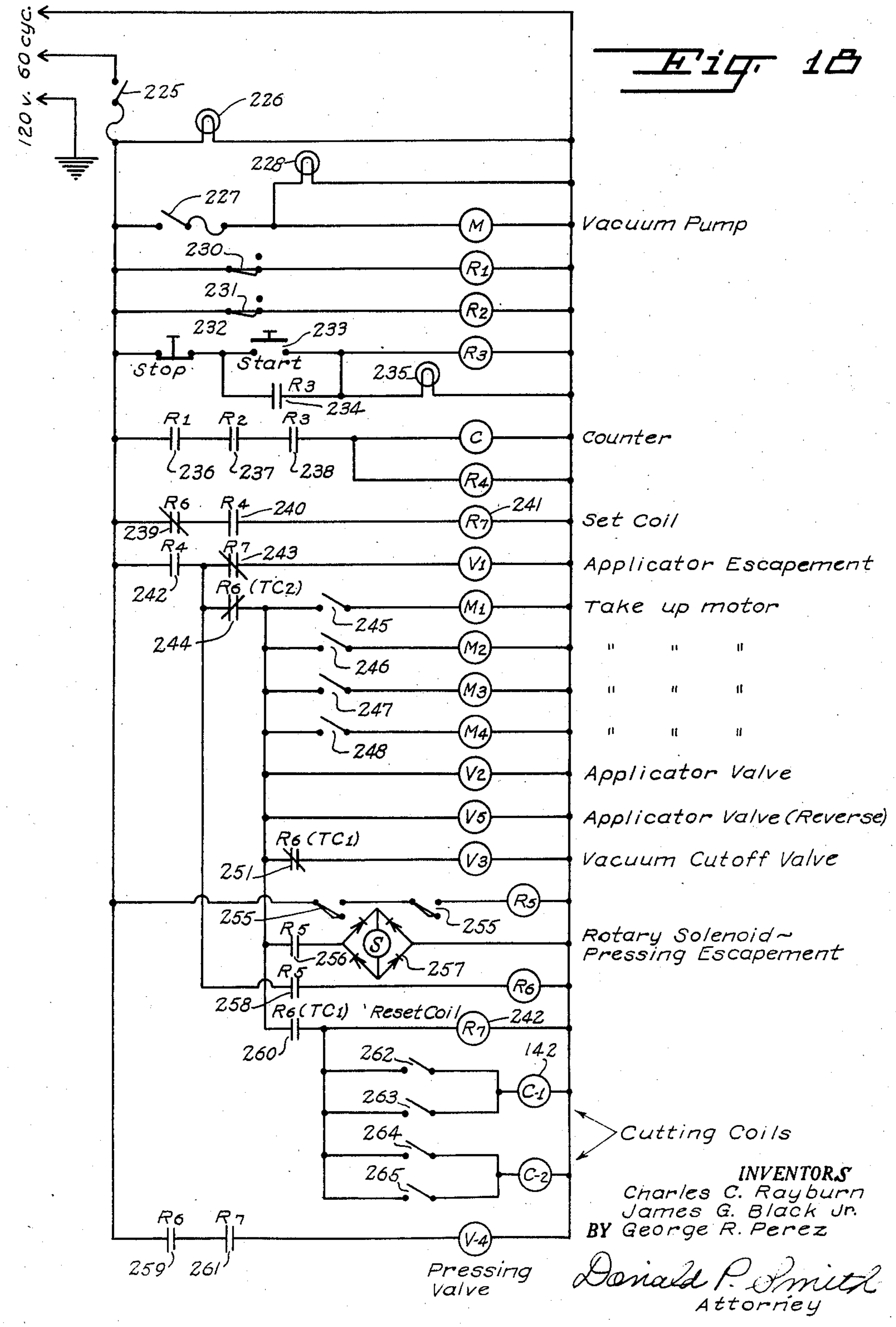
Fig. 18 is a schematic wiring diagram of the tape applicator machine of Figures 1–17.

The control system by which the operation of the various components of the applicator is coordinated in the desired repetitive sequence can be best followed by reference to the schematic diagram of Fig. 18 in conjunction with the other figures showing the preferred embodiment of the components as heretofore described. In general, two sets of switches are actuated as a direct result of the motion of the tape applicator fluid motor 46. One of these is actuated upon retraction of the applicator motor, through the mechanically interlocked 45 degree rotation of the octagonal applicator; the other is actuated upon termination of the forward or pressing stroke of the same motor by means of limit switches actuated near the end of the forward stroke. The operations involved in transporting the wafer, applying tape, cutting tape, pressing tape, and advancing the tape, require a timed sequence of more than the two steps directly available from the two switches. This is accomplished by the use of relay switch contacts which are delayed from operating for a preset time after the energization of the relay by the use of pneumatic dashpot elements.

The sequence of motions required for the processing of one wafer can be appreciated by following the path of a wafer from its release from the storage chute to its release from the pressing station. At the outset, the applicator escapement mechanism is actuated permitting the endwise wafers of the stack of wafers to gravitate into position for tape application. During the retraction of the applicator motor 38, the octagonal head has revolved through 45 degrees. The slack resulting in the tape backing material is then removed by energization of the take-up motors $M^1$, $M^2$, $M^3$ and $M^4$. These motors remain on while the motors are air driven forward at a precontrolled rate until the tape-bearing applicators are pressed against opposite faces of the wafer. At the same time pressure is applied to the tape on the wafer previously discharged from the applicator position by the pressure heads 163 and 167. The stopping escapement 25 for the pressing station is retracted and with the pressure released, a finished wafer falls out. A new segment of tape on the applicator head is cut, Figs. 9 and 10, and the applicator escapement is retracted. Then as the applicator heads are withdrawn, the wafer falls into the presser station, thus completing one cycle.

Referring now to specific details of the control system (Fig. 18), main switch 225 is manually actuated to connect the system to an A.C. power source; this is indicated by operation of pilot lamp 226. A separate manually controlled switch 227 is provided to operate vacuum pump M; this can be sensed by the operator by illumination of pilot lamp 228. In general, the vacuum pump will operate continuously during the time the machine is in operation. In the retracted position of the applicator head (Fig. 12) roller 76 is pressed against a recess in the indexing cam 75 so as to restrain applicator head A in a fixed position. This inwardmost position of rollers 76 causes d.p.s.t. limit switches 229 to close contacts 230 and 231 (inside switch boxes, Fig. 12) and thereby energize relays $R_1$ and $R_2$. A third relay $R_3$ is energized by momentary depression of start switch 233 by the operator which closes the contacts 234 of $R_3$, thus holding relay $R_3$ energized after the start button 233 is released. Pilot lamp 235 indicates energization of relay $R_3$. Contacts of relays $R_1$, $R_2$ and $R_3$, respectively, 236, 237 and 238 are series connected so that with the closing of all three resulting from proper orientation of cam 75 and pushing of start button, a fourth relay $R_4$ will be energized.

Of the two main switching events in the cycle then energization of $R_4$ is the first we consider. It sets off a train of events coincident with the forward motion of the applicator ram. For one, the closing of contact 240 of relay $R_4$ energizes coil 241 of relay $R_7$. Relay $R_7$ is what is known as a set coil relay being mechanically latched upon energization with one set coil 241 so that independent energization of its other reset coil 242 is required to release it. In Fig. 18 contact 243 of coil 241 of relay $R_7$, is shown after set coil operation, so that in series with contact 242 of relay $R_4$ already energized, solenoid valve $V_1$ is energized. As can be seen from Figs. 4 and 1, energization of valve $V_1$ applies regulated air pressure to pistons 9 and 18, thereby moving sliding supports 16 and 17 inward to obstruct the chute while through mechanical linkages 21 and 12, releasing the pressure on sliding escapement stop 7 so as to allow a wafer to proceed down to the applicator position. Contact 242 of relay $R_4$ also completes the circuit through normally closed contact 244 of relay $R_6$ to the four take up motors for the tape backing spools $M_1$, $M_2$, $M_3$ and $M_4$ which can be manually switched by switches 245, 246, 247 and 248, respectively. Contact 242 of relay $R_4$ actuates, in addition, the operating coils of solenoid valves $V_2$ and $V_5$, thereby applying pressure to the driving piston 47 on its blind end through valve $V_2$ and bleeding off the pressure on the rod end at a controlled rate through preset valves 249 and 250 (Fig. 1). One final function of $R_4$, through contact 244 and contact 251 of relay $R_6$, solenoid valve $V_3$ applies pressure to piston 176 which is transmitted directly to the wafer by anvil 166.

Figure 8:
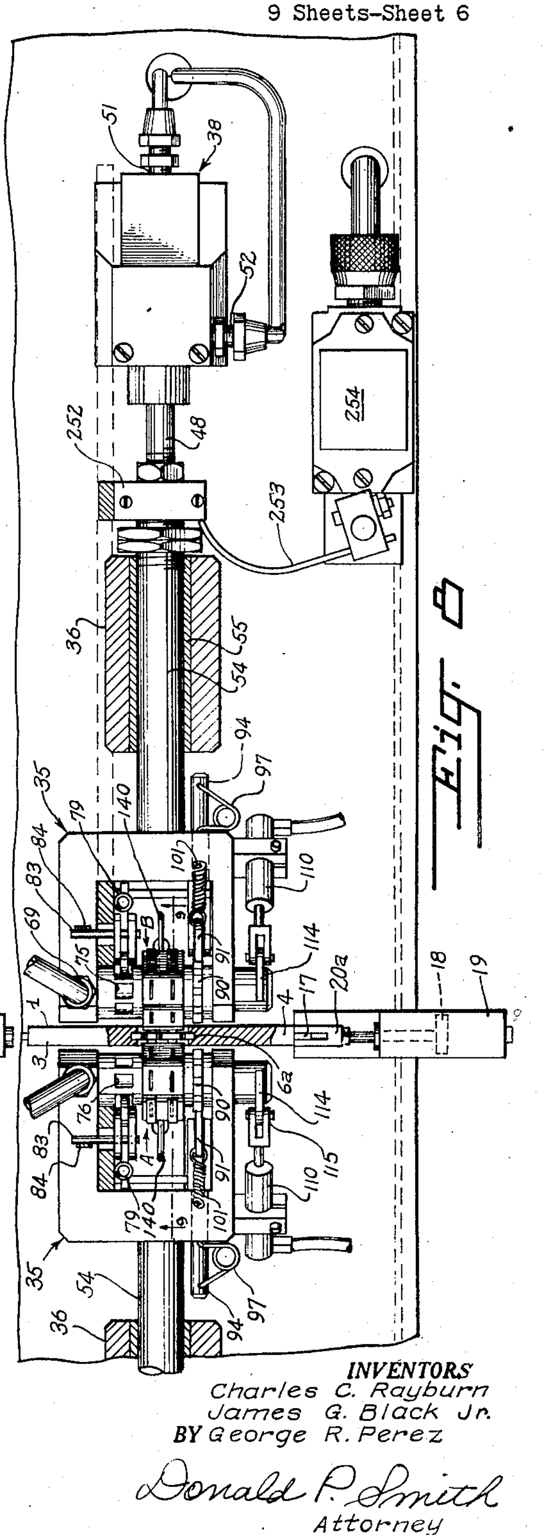
Fig. 8 is a section on line 7—7 of Fig. 2 with the head assembly moved to tape applying position.

In approaching the end of its forward stroke (Fig. 8), sleeve 252 on rod 48 closes contacts 255 (Fig. 18) in switches 254 and the second sequence of events incident to the retraction of the applicator arm is set off. Referring again to Fig. 18, it will be seen that closing of contacts 255 energizes relay coil $R_5$. One contact of $R_5$, 256 energizes the rotary solenoid 257 thereby releasing the pressing station lower stop 160 which will allow the wafer to fall out when the pressing anvil 166 is retracted. Another contact 258 of $R_5$ energizes relay coil $R_6$. Now up to this point, all the actuation has occurred practically simultaneously with one of the two steps, i.e. closing of index cam switches 230 and 231 or the closing of the limit switches 255. However, relay $R_6$ has a pneumatically operated delay for three of its five contacts; no delay for contacts 239 and 259, a short delay for contacts 260 and 251, and a longer delay for contact 244. Contact 239 deenergizes the set coil of relay $R_7$ 241. Contact 259 is closed preparing thereby for the slightly delayed closing of contact 261 thereby actuating solenoid valve $V_4$, releasing pressure anvil 166 and releasing a finished wafer from the machine. Also slightly delayed from the energization time of $R_6$, contact 251 closes, energizing solenoid valve $V_3$ which supplies air pressure to vacuum cut-off valve servo 110. This step disconnects the vacuum source from the heads allowing the heads to retract without danger of pulling the tape off of the wafer. At the same time closing contact 260 energizes the cutting coils $C_1$ and $C_2$ through switches 262, 263, 264 and 265 which thereby severs the tape at an apex of the octagonal applicators A and B.

The longer delay for contacts 244 of relay $R_6$ is set to allow sufficient time for a wafer to drop out of the pressing station, for the tape to be cut, and for the application of tape to be completed on the new wafer. After such a delay contact 244 opens: cutting off the take up motors $M_1$, $M_2$, $M_3$ and $M_4$, deenergizing applicator valves $V_2$ and $V_5$ thus allowing the applicator to be restored by pressure through $V_5$, restoring the vacuum to the applicator head through deenergization of $V_3$, restoring the pressing escapement means, deenergizing relay $R_7$ 242 reset coil and denergizing the cutting coils 142, $C_1$ and $C_2$. In the return of the applicator wheel a 45 degree rotation occurs, new tape is drawn into position and the cycle is ready to start anew.

What we claim is:

1. An applicator for applying tape portions to a component, a sliding shaft, said shaft being mounted for rotation about its axis, a yoke mounted at its base to one end of said shaft with its arms projecting forwardly of the shaft extremity, a rotatable head having a plurality of lateral faces mounted between said yoke arms with its axis transverse to the axis of said shaft, mounting means for rotatably and slidably supporting said shaft, a panel member connected with said shaft and yoke and rotatable therewith, power means mounted on the panel member and connected to said head for rotating said head about its axis to move said lateral faces in sequence through a plurality of positions, guide means for supporting a component adjacent to one of the faces of said rotatable head when located in one of said positions, means mounted on said panel member for feeding one end portion of said tape to one of said lateral faces of said head, means including a port for applying a vacuum to said tape end portion to hold said tape end portion on said head when said head is rotated, a cutting element mounted on said panel member for cutting said tape prior to movement of said head to a position locating said tape adjacent to said component, power means for sliding said shaft and said head to cause the latter to move the severed tape into engagement with said component when the face of said head carrying said tape is positioned adjacent to said component, and a valve structure in said port to open said port to atmosphere when the tape is applied to the component.

2. An applicator for applying tape portions to a component, said applicator comprising an axially reciprocating rotary shaft having a rotatable head mounted at one end, mounting means rotatably supporting said head with its axis intersecting said shaft axis, power means connected to said head for rotating said head through a plurality of positions, feed means adjacent to a first one of said positions of said head for feeding tape to said head, guide means at a second one of said positions of said head for supporting said component adjacent to said head, a cutting element mounted adjacent to a third one of said positions of said head intermediate said first and second positions to sever an end portion from said tape, means for applying a vacuum to one face of said tape end portion to hold said tape end portion to said head when said head is rotated from said third to said second positions, said last-named means including a source of vacuum connected to said head, a port extending through said head, a valve structure in said port, means to operate said valve to open said port to said vacuum source when said head is in said third position and to close said port when said head is in said second position, and a panel structure fixed to said shaft for movement therewith, and said power means rotating said head, tape feeding means and cutting element all being mounted on said panel for rotation with said head for applying tape to said component at predetermined angles.

3. An applicator for applying tape portions to a component, said applicator comprising an axially sliding rotary shaft having a rotatable head, means rotatably supporting said head mounted with its axis transverse to the axis of said shaft, motor means connected to said head for intermittently rotating said head about its axis through a plurality of positions, means adjacent to a first one of said positions of said head for feeding tape to said head, guide means at a second one of said positions of said head for supporting said component adjacent to said head, a cutting element mounted adjacent to a third one of said positions of said head intermediate said first and second positions to sever an end portion from said tape, means for applying a vacuum to one surface of said tape end portion to hold said tape end portion to said head when said head is rotated from said third to said second positions, a motor assembly including structure for moving said head on said mounting means toward said guide means to apply said tape end portion in said second position to said component, means for applying a vacuum to said tape end portion including a port in said head, a source of vacuum connected to said port and a valve in said port for removing said vacuum from said tape end portion in said second position of said head, and a panel assembly rigidly connected with said shaft and supporting said feeding means and cutting means, said panel being swingable with said shaft during its rotation to position the tape prior to attachment to said component.

4. In an applicator for applying tape portions to a component, said applicator including a reciprocating rotary shaft, a rotatable head mounted at one end of said shaft, mounting means for rotatably securing said head on said shaft with its axis intersecting the axis of said shaft, power actuated pawl and ratchet means connected to said head for rotating said head through a plurality of positions, means adjacent to a first one of said positions of said head for feeding tape to said head, guide means at a second one of said positions of said head for supporting said component adjacent to said head, a cutting means mounted adjacent to a third one of said positions of said head intermediate said first and second positions to sever an end portion from said tape, means for applying a vacuum to one face of said tape end portion to hold said tape end portion to said head when said head is rotated from said third to said second positions, said last-means including a source of vacuum connected to said head, a port extending through said head, a valve structure in said port, means to operate said valve to open said port to said vacuum source when said head is in said third position and to close said port when said head is in said second position, and a supporting structure rigidly connected with said head and said shaft for rotation therewith, said supporting structure mounting said feeding means and cutting means, whereby said last-named feeding and cutting means are movable during the rotation of said shaft to facilitate their operation regardless of the position of said shaft, and means for locking said shaft at predetermined positions, whereby the tape on said head is angularly positioned with respect to the adjacent face of the component to which it is to be applied.

5. In an apparatus for applying resistor tape to ceramic wafers, a wafer feeding means including an escapement mechanism for delivering a single wafer to a predetermined position, means for supporting said wafer in said position, a tape applicator mechanism arranged at each side of said supported wafer, each of said applicator mechanisms including a slidable and rotatable mounting shaft, a reciprocating fluid motor connected to one end of said shaft for reciprocating said shaft towards and away from said wafer, an applicator head mounted at the other end of said shaft, said applicator head being arranged transverse to said sliding shaft and being rotatably supported thereby, a panel structure fixedly connected to said sliding and rotatable shaft, pawl and ratchet means mounted on said panel structure for intermittently rotating said applicator head, said last-named means being operated by said shaft when moved by the motor in one direction, means on said panel supporting a supply of tape having backing adhesively secured thereto, means mounted on the panel for feeding the tape from said supply to said applicator head, power means on said panel for stripping said backing from said tape, said power means being operated during rotation of the applicator head, and means mounted on the panel for severing the end portion of the tape after it is attached to said head and prior to its application to said ceramic wafer.

6. The structure of claim 5 characterized in that the power means stripping said backing from the tape includes motor driven rolls, the motor driving the rolls being controlled by movement of the slidable and rotatably mounted shaft.

7. The structure of claim 5 characterized in that adjustable means are provided for regulating the stroke of the sliding shaft by said reciprocating fluid motor to provide a selected application of pressure between the applicator head and the ceramic wafer.

8. The structure of claim 5 characterized in that the applicator mechanims are provided with controls for their selective operation.

9. The structure of claim 5 characterized in that the applicator mechanisms are provided with controls for their selective operation and means are provided when the applicator heads are operated singly for automatically positioning the other applicator head to provide a backing for the ceramic wafer.

10. The structure of claim 5 characterized in that means are provided for securing the applicator head in a fixed position after each actuation by said pawl and ratchet means.

11. The structure of claim 5 characterized in that a fixed mounting is provided for each of the sliding and rotatable shafts, and a lock member is carried by the associated panel for engagiig the fixed mounting to secure the head in adjusted position for applying the tape in predetermined angular positions on the wafer.

12. The structure of claim 5 characterized in that a fixed mounting is provided for each of the sliding and rotatable shafts, and a manually actuated lock member is carried by the associated panel for engaging the fixed mounting to secure the head in adjusted position for applying the tape in predetermined angular positions on the wafer.

13. The structure of claim 5 characterized in that one of the panels is provided with means for locking the same in predetermined angular positions for adjusting the applicator head for applying the tape to the wafer in predetermined angular positions.

References Cited in the file of this patent

UNITED STATES PATENTS

| | | |
|---|---|---|
| 1,402,293 | Heist | Jan. 3, 1922 |
| 1,440,856 | Westcott | Jan. 2, 1923 |
| 1,654,647 | Heist | Jan. 3, 1928 |
| 1,700,005 | Wall | Jan. 22, 1929 |

(Other references on following page)

UNITED STATES PATENTS

| | | |
|---|---|---|
| 2,033,849 | Mudd | Mar. 19, 1936 |
| 2,311,969 | Schenck et al. | Feb. 23, 1943 |
| 2,384,231 | Bamford | Sept. 4, 1945 |
| 2,472,440 | Salfisberg | June 7, 1949 |
| 2,483,458 | Fischer et al. | Oct. 4, 1949 |
| 2,497,212 | Donofrio | Feb. 14, 1950 |
| 2,590,239 | Elsman | Mar. 25, 1952 |
| 2,606,681 | Ridenour | Aug. 12, 1952 |
| 2,689,056 | Dewyer | Sept. 14, 1954 |
| 2,698,644 | Hauk | Jan. 4, 1955 |
| 2,732,880 | Hawk | Jan. 31, 1956 |
| 2,779,385 | Carlzen et al. | Jan. 29, 1957 |
| 2,818,908 | Byrnes et al. | Jan. 7, 1958 |